(12) United States Patent
Huang et al.

(10) Patent No.: US 11,680,680 B1
(45) Date of Patent: Jun. 20, 2023

(54) MULTI-FUNCTIONAL AND EXTENDABLE MOUNTING STAND AND COUPLING JOINT THEREOF

(71) Applicant: RELIANCE INTERNATIONAL CORP., Taipei (TW)

(72) Inventors: Chi-Chia Huang, Taipei (TW); Cheng-Lin Ho, Taipei (TW)

(73) Assignee: RELIANCE INTERNATIONAL CORP., Taipei (TW)

( * ) Notice: Subject to any disclaimer, the term of this patent is extended or adjusted under 35 U.S.C. 154(b) by 0 days.

(21) Appl. No.: 17/696,021

(22) Filed: Mar. 16, 2022

(30) Foreign Application Priority Data

Feb. 17, 2022 (CN) .......................... 202210145113.5

(51) Int. Cl.
*F16M 13/02* (2006.01)
(52) U.S. Cl.
CPC ....... *F16M 13/022* (2013.01); *F16M 2200/06* (2013.01)
(58) Field of Classification Search
CPC .................. F16M 13/022; F16M 2200/06
USPC ................. 248/276.1; 403/52, 119
See application file for complete search history.

(56) References Cited

U.S. PATENT DOCUMENTS

| 9,897,251 | B2 * | 2/2018 | Agbodoe | A61B 90/50 |
| 10,309,578 | B2 * | 6/2019 | Yen | F16M 11/041 |
| 11,035,518 | B2 * | 6/2021 | Hung | F16M 11/048 |
| 11,109,718 | B1 * | 9/2021 | Sloat | F16M 13/022 |
| 11,125,382 | B2 * | 9/2021 | Hung | F16M 11/2014 |
| 11,193,527 | B2 * | 12/2021 | Li | F16M 11/2092 |
| 11,285,064 | B2 * | 3/2022 | Fouts | A61G 13/101 |

FOREIGN PATENT DOCUMENTS

WO    WO-2016077743 A1 *  5/2016 .......... F16M 11/041

* cited by examiner

*Primary Examiner* — Todd M Epps
(74) *Attorney, Agent, or Firm* — Bacon & Thomas, PLLC

(57) ABSTRACT

A multi-functional and extendable mounting stand has a clamp and an extending assembly including at least one coupling joint and at least one extending rod arranged alternately and connected sequentially. Each coupling joint has a first connecting seat, a mounting seat mounted on the first connecting seat, a second connecting seat mounted through the first connecting seat and the mounting seat, and a knob connected to the second connecting seat. At least one ends of the extending rod is connected to at least one ends of the at least one coupling joint. The clamp is connected to one end of the extending assembly. A holder, a lighting apparatus or a recording apparatus is connected to the extending assembly and can be adjusted to a height and an angular position that allow a user to use the holder in a comfortable pose or to the best recoding or lighting position.

15 Claims, 8 Drawing Sheets

MULTI-FUNCTIONAL AND EXTENDABLE MOUNTING STAND AND COUPLING JOINT THEREOF

BACKGROUND OF THE INVENTION

1. Field of the Invention

The present invention relates to a mounting stand and a coupling joint of the mounting stand, especially to a multi-functional and extendable mounting stand on which an item is mounted, and a position and an angle of the item can be adjusted according to personal needs and operating environment.

2. Description of the Prior Art(s)

A tablet electronic device is in the shape of a thin plate with computer components such as a touch screen, a central process unit, batteries, hard disks, computer memories, a wireless module and the like integrated inside the tablet electronic device, such that the tablet electronic device functions as a personal computer. In recent years, the tablet electronic devices, such as smart phones, tablet computers, e-book readers and the like, are popular for their versatility, lightness and portability. With the progress of technology, the tablet electronic device has been able to store a large amount of data. Therefore, more and more users are used to reading novels, magazines, or storing reference books such as sheet music, recipes and the like with the tablet electronic device, so that they can be easily searched and read at any time.

However, there is no supporting structure on the tablet electronic device that can allow the tablet electronic device to stand on a plane or be set up in one space. Consequently, most of the users can only read information shown on the table electronic device or operate the touch screen by holding the table electronic device with their hands or placing the table electronic device on the plane. It is easy to cause chronic injuries such as stiffness of fingers and curvature of the cervical spine after using the tablet electronic device for a long time.

To overcome the shortcomings, the present invention provides a multi-functional and extendable mounting stand and a coupling joint of the mounting stand to mitigate or obviate the aforementioned problems.

SUMMARY OF THE INVENTION

The main objective of the present invention is to provide a multi-functional and extendable mounting stand that has an extending assembly and a clamp. The extending assembly has two ends and includes at least one coupling joint and at least one extending rod.

Each of the at least one coupling joint has two coupling ends, a first connecting seat, a mounting seat, a second connecting seat, and a knob. One of the coupling ends of the coupling joint is formed on the first connecting seat, and the first connecting seat has: a mounting end; and an annular groove formed in an outer surface of the mounting end of the first connecting seat. The mounting seat has: a mounting recess formed in a lower end surface of the mounting seat and the mounting end of the first connecting seat protruding in the mounting recess; a slit longitudinally formed through an upper end surface and the lower end surface of the mounting seat and formed through a side surface of the mounting seat; and a through hole extending transversely and formed through the side surface of the mounting seat. A first central axis is defined along an extension direction along which the mounting recess extends, a second central axis is defined along an extension direction along which the through hole extends, and the first central axis and the second central axis are skew. The other coupling end of the coupling joint is formed on the second connecting seat, and the second connecting seat has a connecting rod. The connecting rod protrudes from a side surface of the second connecting seat, is mounted through the through hole of the mounting seat, and extends along a tangent line of the annular groove of the first connecting seat to pass through the annular groove. The connecting rod is movable along the annular groove and is rotatable in the annular groove. The knob is connected to the connecting rod of the second connecting seat. The mounting seat is held between the side surface of the second connecting seat and the knob.

Each of the at least one extending rod has two connecting ends. The at least one coupling joint and the at least one extending rod are arranged alternately and are connected sequentially, and at least one of the connecting ends of the extending rod is connected to at least one of the coupling ends of the at least one coupling joint. The clamp is connected to one of the coupling ends of the extending assembly.

A holder for holding a tablet electronic device, a lighting apparatus or a recording apparatus is connected to the extending assembly. When the knob is rotated to allow the mounting seat to loosen from the mounting end of the first connecting seat, the second connecting seat and the mounting seat can be driven to rotate around the mounting end of the first connecting seat and the second connecting seat and the extending rod that is connected with said second connecting seat can also be rotated sideways relative to the mounting seat and the first connecting seat. In this way, angular positions and extending directions of the extending rod that is connected to the second connecting seat can be adjusted.

The tablet electronic device mounted on the holder can be adjusted to a height and an angular position that allow a user to read the tablet electronic device in a comfortable pose. Ancillary equipment such as the lighting apparatus, the recording apparatus and the like can also be mounted on the multi-functional and extendable mounting stand of the present invention, so as to adjust the ancillary equipment to the best recoding or lighting position.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
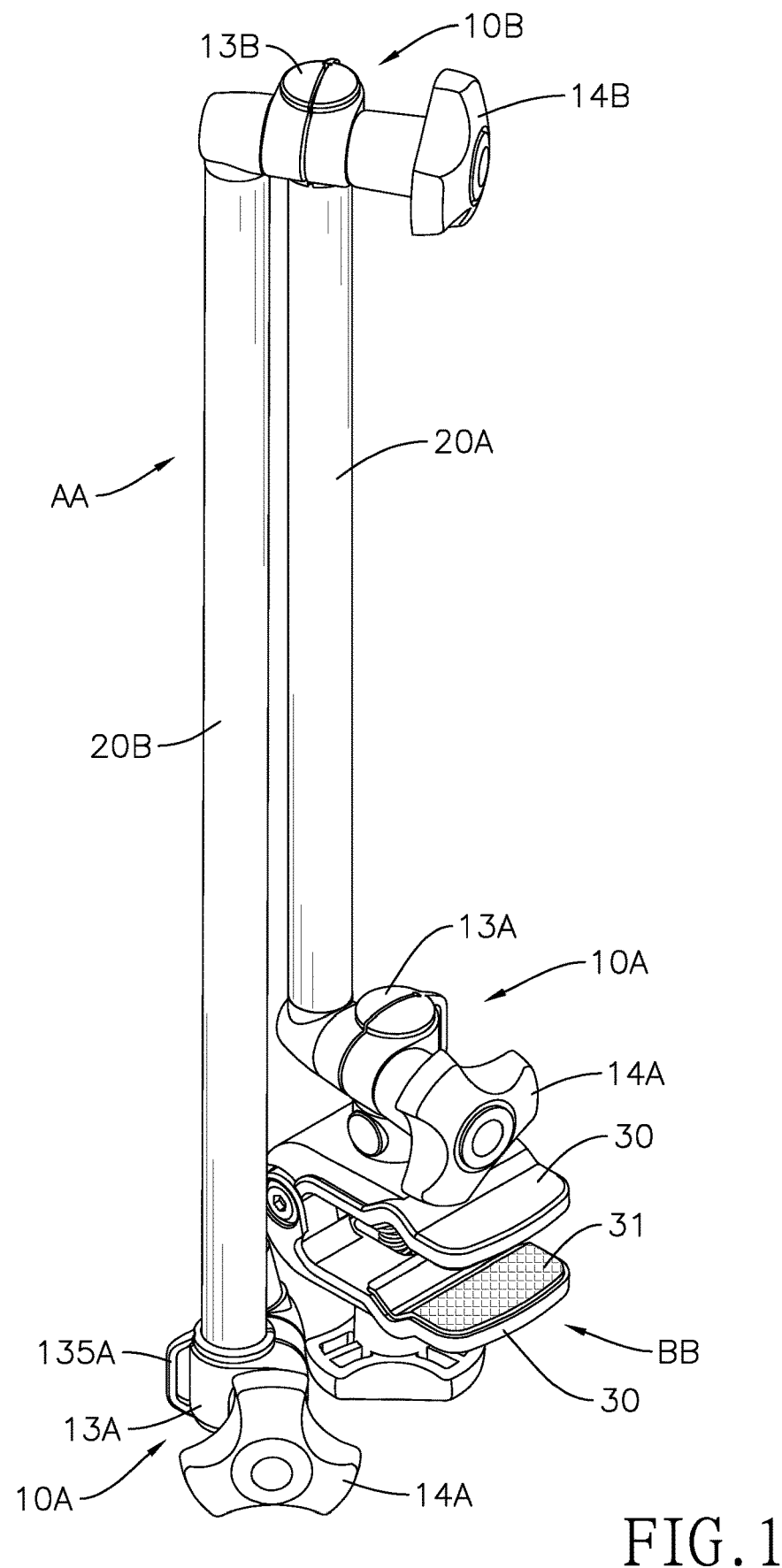
FIG. 1 is a perspective view of a multi-functional and extendable mounting stand in accordance with the present invention, shown folded.
Figure 2:
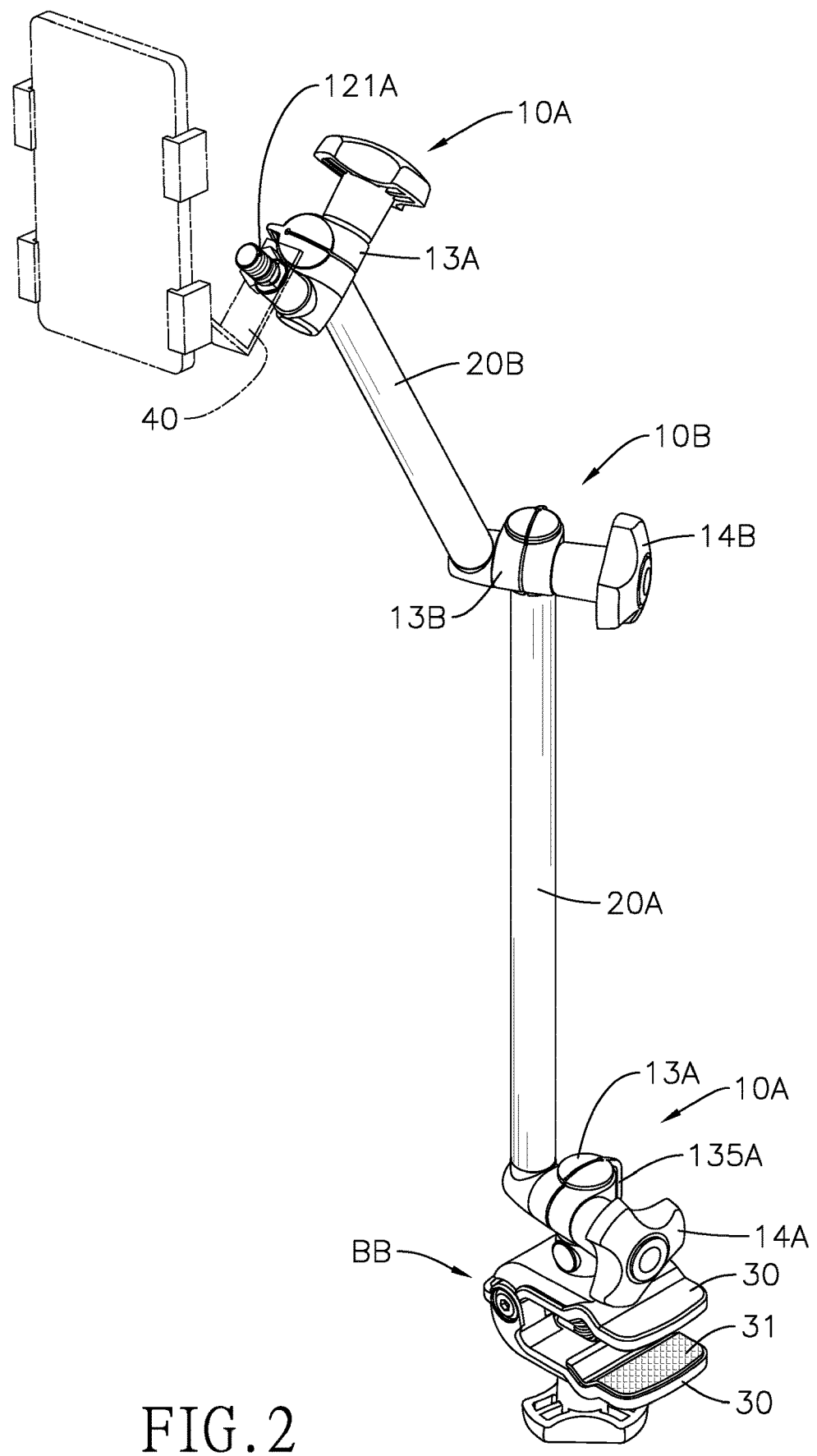
FIG. 2 is a perspective view of the multi-functional and extendable mounting stand in FIG. 1, shown unfolded.

With reference to FIGS. 1 and 2, a multi-functional and extendable mounting stand in accordance with the present invention comprises an extending assembly AA and a clamp BB.

The extending assembly AA is formed as an elongated frame and has two ends. The extending assembly AA includes at least one coupling joint 10A, 10B and at least one extending rod 20A, 20B. The at least one coupling joint 10A, 10B and the at least one extending rod 20A, 20B are arranged alternately and are connected sequentially.

Figure 3:
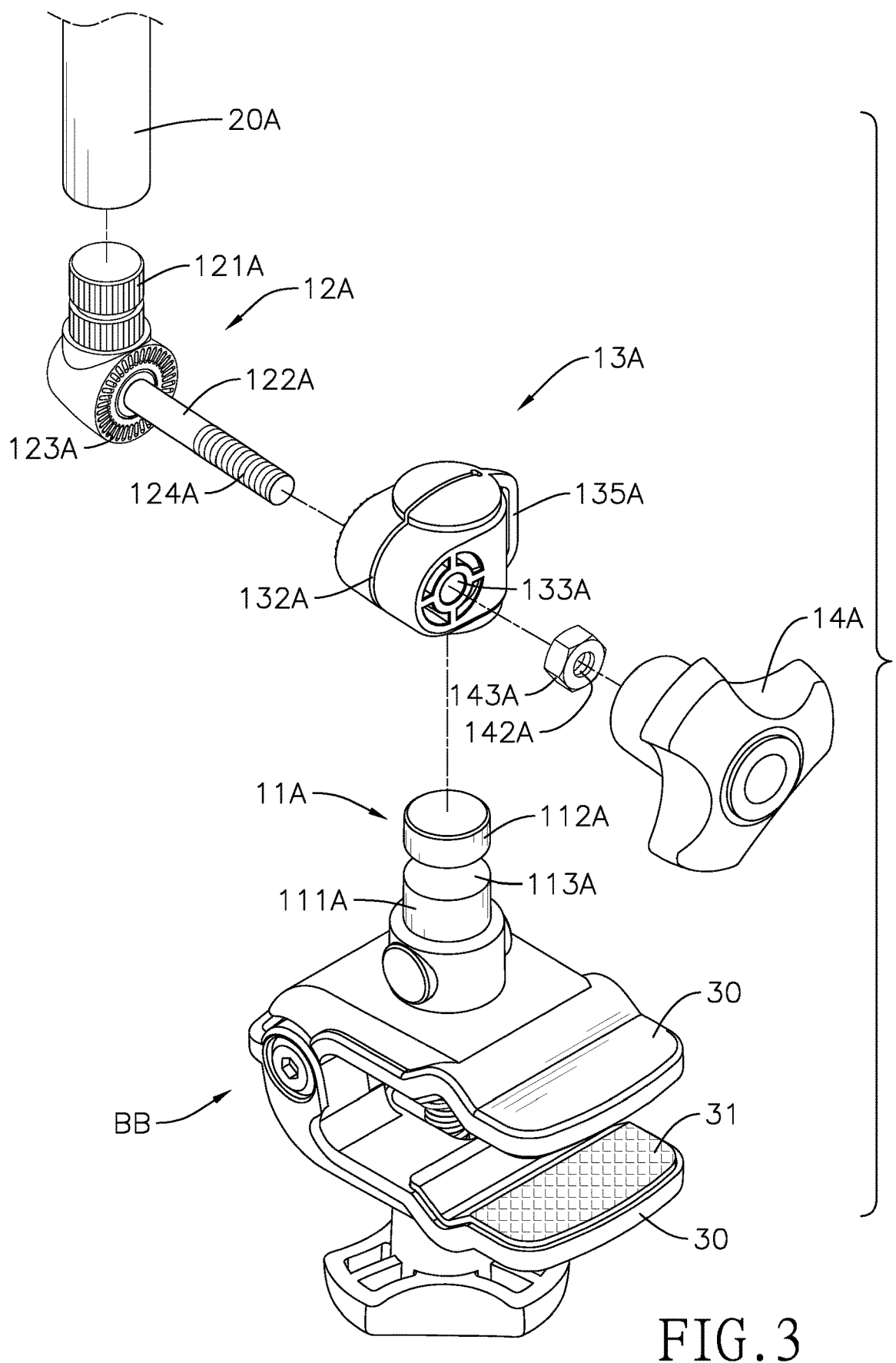
FIG. 3 is an exploded perspective view of a mounting joint of the multi-functional and extendable mounting stand in FIG. 1.
Figure 4:
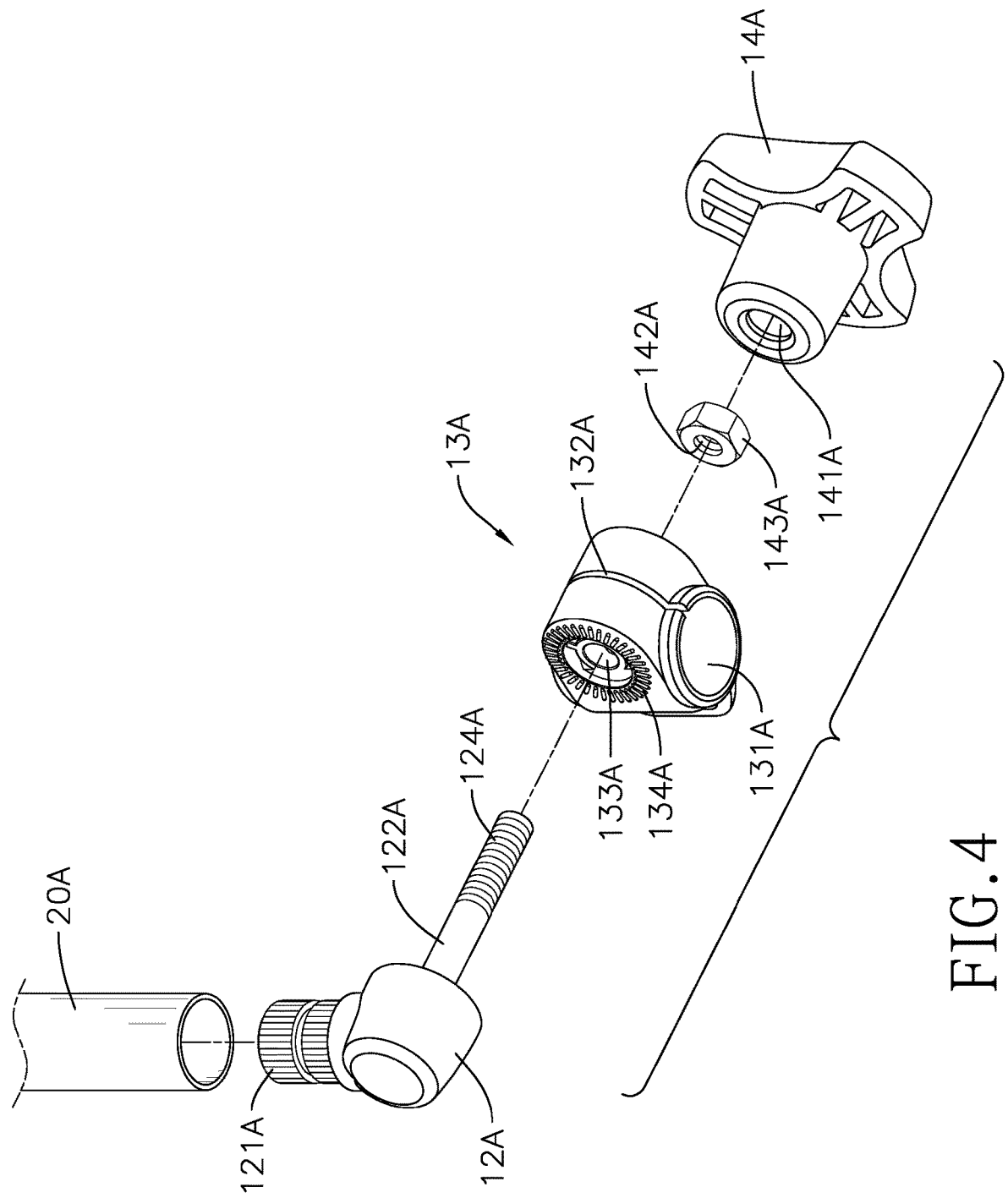
FIG. 4 is another exploded perspective view of the mounting joint in FIG. 3.
Figure 5:
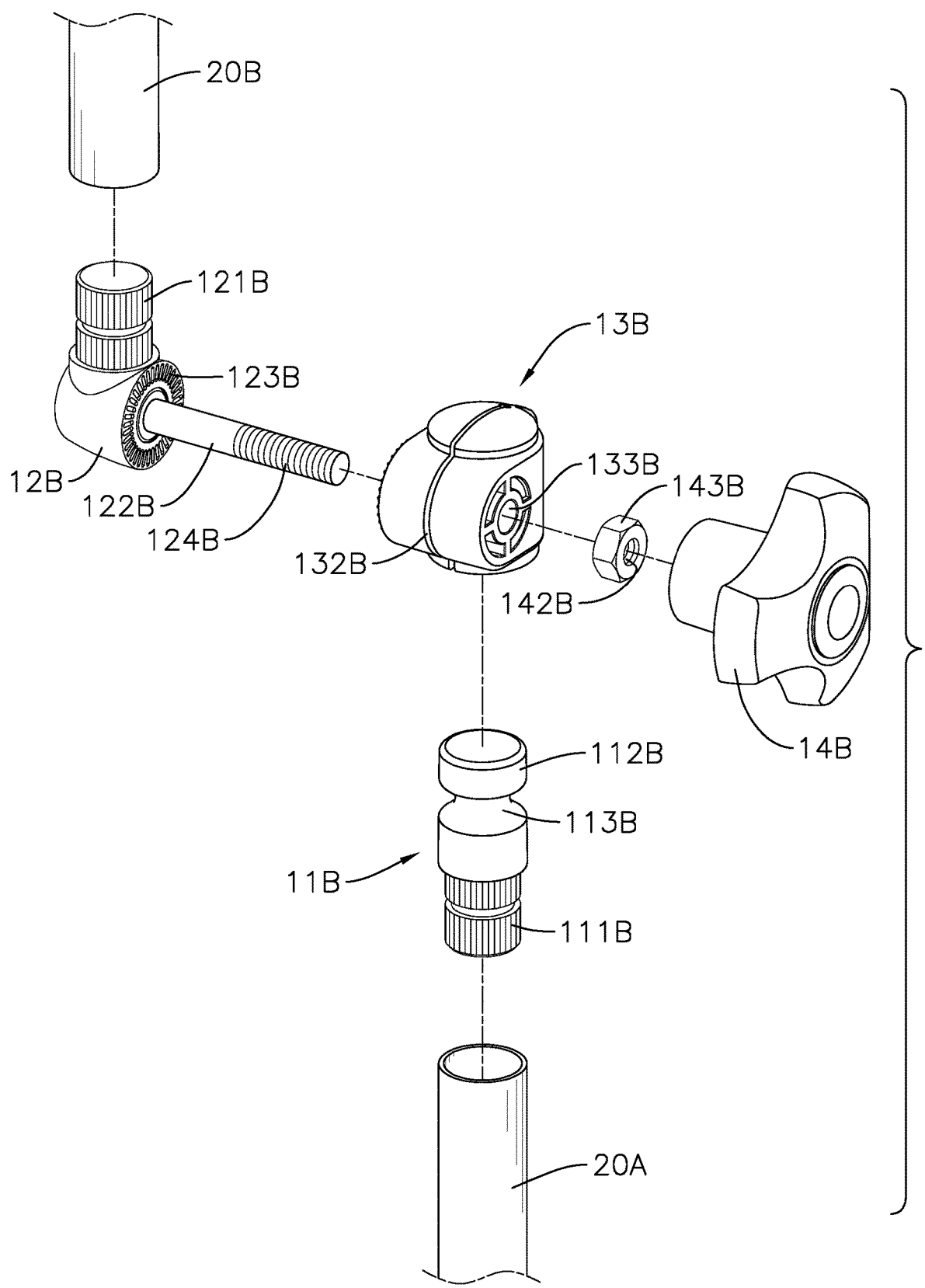
FIG. 5 is an exploded perspective view of another mounting joint of the multi-functional and extendable mounting stand in FIG. 1.

With further reference to FIGS. 3 to 5, each of the coupling joint 10A, 10B has two coupling ends 111A, 111B, 121A, 121B, a first connecting seat 11A, 11B, a mounting seat 13A, 13B, a second connecting seat 12A, 12B, and a knob 14A, 14B.

One of the coupling ends 111A, 111B of the coupling joint 10A, 10B is formed on the first connecting seat 11A, 11B. The first connecting seat 11A, 11B has a mounting end 112A, 112B and an annular groove 113A, 113B. The annular groove 113A, 113B is formed in an outer surface of the mounting end 112A, 112B of the first connecting seat 11A, 11B.

With reference to FIGS. 3 to 6, the mounting seat 13A, 13B is mounted on the mounting end 112A, 112B of the first connecting seat 11A, 11B and the annular groove 113A, 113B is disposed inside the mounting seat 13A, 13B. The mounting seat 13A, 13B has an upper end surface, a lower end surface, a side surface, a mounting recess 131A, a slit 132A, 132B, a through hole 133A, 133B, a stationary engaging surface 134A, and a cable management ring 135A, 135B. The upper end surface and the lower end surface are oppositely defined on the mounting seat 13A, 13B.

The mounting recess 131A is formed in the lower end surface of the mounting seat 13A, 13B. The mounting end 112A, 112B of the first connecting seat 11A, 11B protrudes in the mounting recess 131A. The slit 132A, 132B is longitudinally formed through the upper end surface and the lower end surface of the mounting seat 13A, 13B and is formed through the side surface of the mounting seat 13A, 13B. The slit 132A, 132B divides the mounting seat 13A, 13B into two blocks that are connected on one side. When the two blocks are pressed to approach each other, the two blocks tends to bounce back. The through hole 133A, 133B extends transversely and is formed through the mounting seat 13A, 13B and has two ends. The two ends of the through hole 133A, 133B are formed through the side surface of the mounting seat 13A, 13B. A first central axis is defined along an extension direction along which the mounting recess 131A extends. A second central axis is defined along an extension direction along which the through hole 133A, 133B extends. The first central axis and the second central axis are skew.

The stationary engaging surface 134A is formed on the side surface of the mounting seat 13A, 13B and around one of the ends of the through hole 133A, 133B. The cable management ring 135A, 135B is formed on the side surface of the mounting seat 13A, 13B.

The other coupling end 121A, 121B of the coupling joint 10A, 10B is formed on the second connecting seat 12A, 12B. The second connecting seat 12A, 12B has a side surface, a connecting rod 122A, 122B and a rotating engaging surface 123A, 123B.

The connecting rod 122A, 122B protrudes from the side surface of the second connecting seat 12A, 12B. The connecting rod 122A, 122B is mounted into the through hole 133A, 133B of the mounting seat 13A, 13B from the end, around which the stationary engaging surface 134A is formed, of the through hole 133A, 133B of the mounting seat 13A, 13B, extends along a tangent line of the annular groove 113A, 113B of the first connecting seat 11A, 11B to pass through the annular groove 113A, 113B, and the protrudes out of the through hole 133A, 133B of the mounting seat 13A, 13B. The connecting rod 122A, 122B abuts against a groove bottom defined in the annular groove 113A, 113B, is movable along the annular groove 113A, 113B, and is rotatable in the annular groove 113A, 113B.

The rotating engaging surface 123A, 123B is formed on the side surface of the second connecting seat 12A, 12B and around the connecting rod 122A, 122B. The rotating engaging surface 123A, 123B selectively engages with the stationary engaging surface 134A of the mounting seat 13A, 13B, so as to fix a relative angular position of the second connecting seat 12A, 12B and the mounting seat 13A, 13B.

The knob 14A, 14B is connected to the connecting rod 122A, 122B of the second connecting seat 12A, 12B. The mounting seat 13A, 13B is held between the side surface of the second connecting seat 12A, 12B and the knob 14A, 14B. Specifically, the connecting rod 122A, 122B of the second connecting seat 12A, 12B and the knob 14A, 14B are connected with each other via threads. In the preferred embodiment of the present invention, the connecting rod 122A, 122B is provided with an external thread 124A, 124B. The knob 14A, 14B has a connecting recess 141A and an internal thread 142A, 142B formed inside the connecting recess 141A. The connecting rod 122A, 122B protrudes in the connecting recess 141A, and the knob 14A, 14B and the connecting rod 122A, 122B are connected with each other via the internal thread 142A, 142B and the external thread 124A, 124B. Thus, when the knob 14A, 14B is rotated, the knob 14A, 14B moves toward or away from the mounting seat 13A, 13B, such that the mounting seat 13A, 13B can be securely held selectively. Specifically, the internal thread 142A, 142B of the knob 14A, 14B is formed on a nut 143A, 143B and the nut 143A, 143B is securely mounted in the connecting recess 141A of the knob 14A, 14B.

Each of the at least one extending rod 20A, 20B has two connecting ends. At least one of the connecting ends of the extending rod 20A, 20B is connected to at least one of the coupling ends 111A, 111B, 121A, 121B of the at least one coupling joint 10A, 10B. The coupling joint 10A may be disposed on one of the ends of the extending assembly AA, i.e., the coupling joint 10A may be connected to one of the at least one extending rod 20A, 20B. Each of the coupling joint 10B may be connected to two of the at least one extending rod 20A, 20B that are disposed next to each other.

Specifically, one of the connecting ends of the extending rod 20A, 20B that is disposed on one of the ends of the extending assembly AA is connected to one of the coupling ends 111A, 111B of the coupling joint 10A that is disposed next to the extending rod 20A, 20B. The two connecting ends of the extending rod 20A, 20B that is disposed between two of the at least one coupling joint 10A, 10B are connected to the coupling end 111A, 111B of the first connecting seat 11A, 11B of one of the at least one coupling joint 10A and the coupling end 121A, 121B of the second connecting seat 12A, 12B of the other one of the at least one coupling joint 10B.

The clamp BB is connected to one of the coupling ends 111A, 111B, 121A, 121B of the extending assembly AA. In the preferred embodiment of the present invention, the clamp BB is connected to the coupling end 111A, which is defined as one of the ends of the extending assembly AA, of the first connecting seat 11A of the coupling joint 10A. The clamp BB is used to clamp on a table board, a drum rack, a microphone stand, a keyboard stand, a music stand, and so on, so as to fix the multi-functional and extendable mounting stand of the present invention at a specific position. In the preferred embodiment of the present invention, the clamp BB includes two clamping plates 30 pivotally connected with each other. Each of the two clamping plates 30 has an inner surface. The inner surface of the clamping plate 30 faces toward the inner surface of the other clamping plate 30 and is provided with a cushion pad 31

Figure 7:
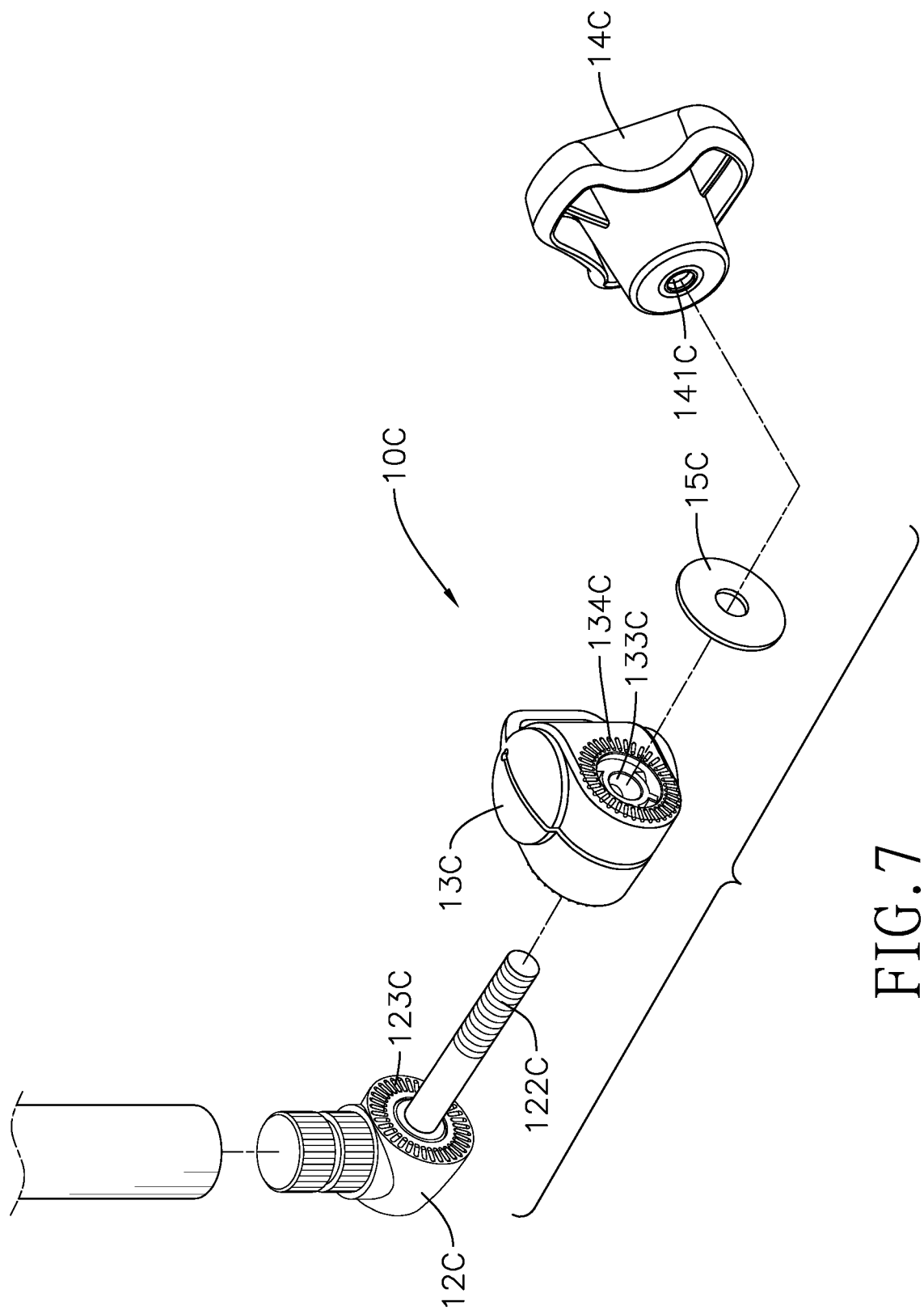
FIG. 7 is a perspective view of another embodiment of a mounting joint in accordance with the present invention.
Figure 8:
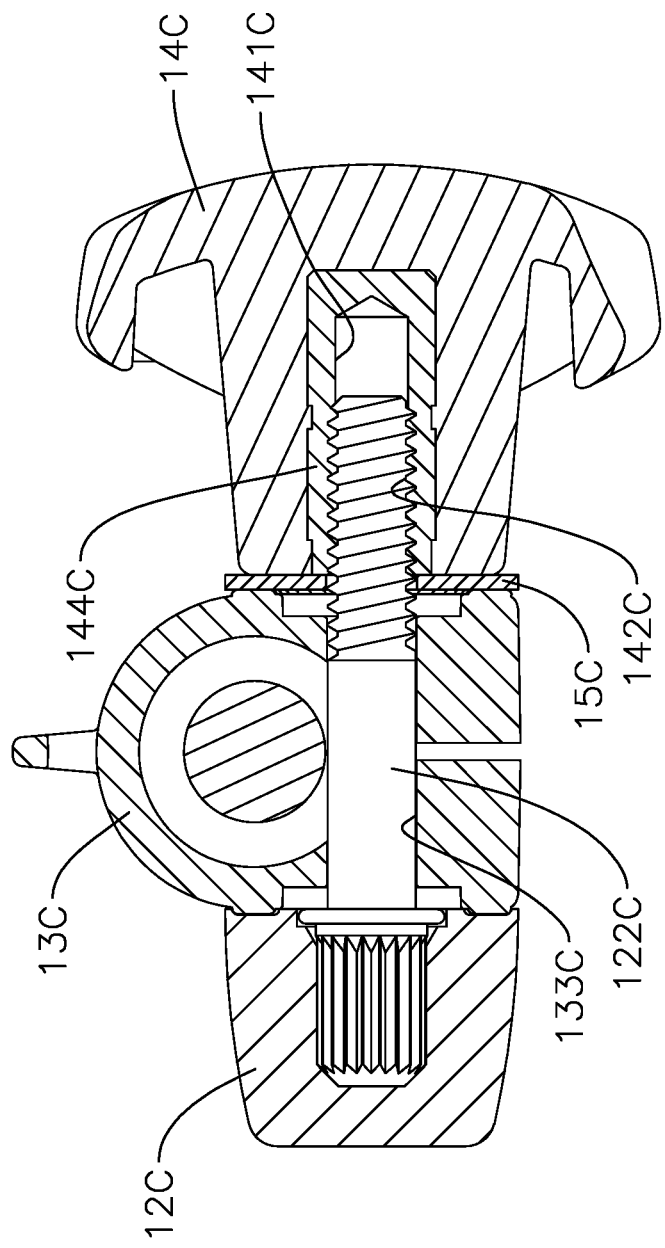
FIG. 8 is a cross-sectional top view of the mounting joint in FIG. 7.

With further reference to FIGS. 7 and 8, another embodiment of the coupling joint 10C is shown. The mounting seat 13C has two stationary engaging surfaces 134C oppositely formed on the side surface of the mounting seat 13C and facing toward the rotating engaging surface 123C of the second connecting seat 12C and the knob 14C respectively. A washer 15C is placed between the mounting seat 13C and the knob 14C. The connecting rod 122C of the second connecting seat 12C is sequentially mounted through the through hole 133C of the mounting seat 13C and the washer 15C and then is connected to the knob 14C, such that the washer 15C is held between the knob 14C and the stationary engaging surface 134C that faces toward the knob 14C. The washer 15C is configured to distribute pressure between the mounting seat 13C and the knob 14C, so as to prevent the mounting seat 13C and the knob 14C from being damaged. A sleeve 144C is substituted for the nut 143A, 143B. The sleeve 144C is securely mounted in the connecting recess 141C of the knob 14C and the internal thread 142C of the knob 14C is formed on an inner sidewall of the sleeve 144C.

As shown in FIG. 2, a holder 40 for holding a tablet electronic device is connected to the extending assembly AA. A power cable or a charging cable of the tablet electronic device is arranged along the extending assembly AA. The power cable or the charging cable may be mounted through the cable management ring 135A, 135B of the mounting seat 13A, 13B or may be tied to the cable management ring 135A, 135B, so as to keep the mounting stand neat.

The clamp BB and the holder 40 are connected to the two ends of the extending assembly AA respectively. In the preferred embodiments of the present invention, the two ends of the extending assembly AA are disposed with the coupling joints 10A respectively. Accordingly, the clamp BB is connected to the coupling end 111A of the first connecting seat 11A of a corresponding one of the coupling joints 10A, and the holder 40 is connected to the coupling end 121A of the second connecting seat 12A of a corresponding one of the coupling joints 10A.

Figure 6:
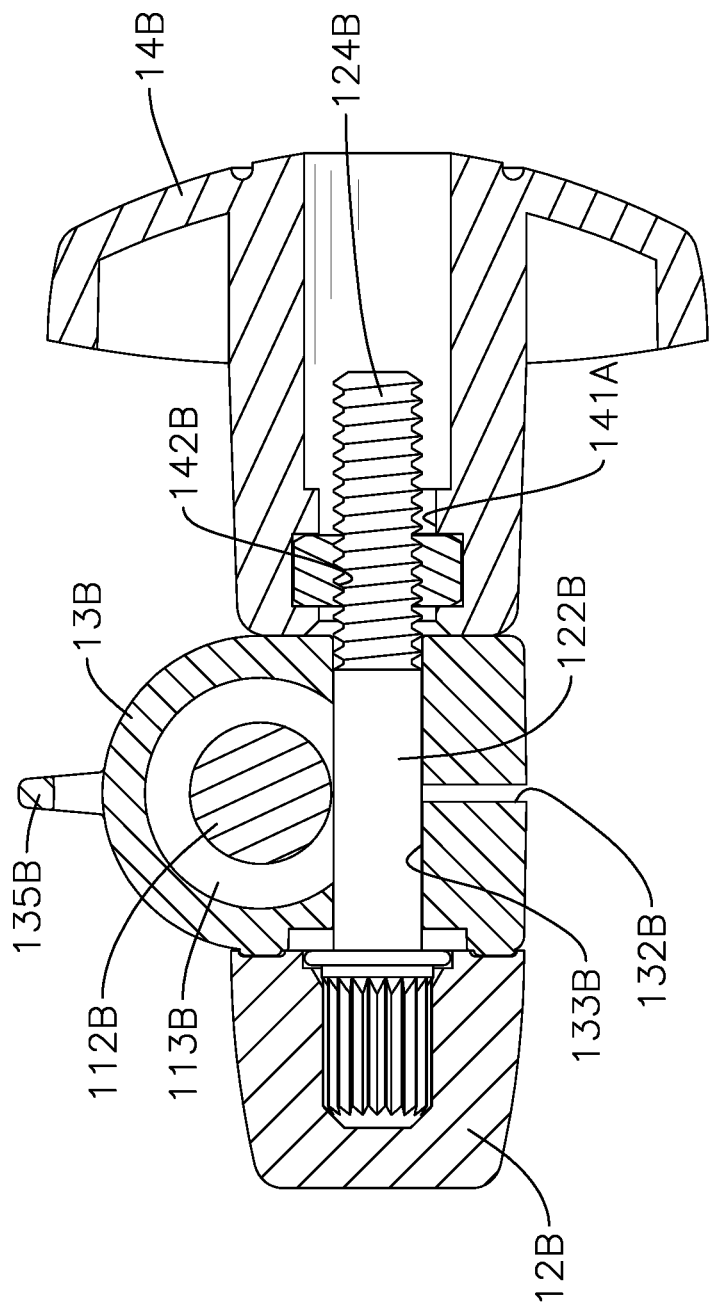
FIG. 6 is a cross-sectional top view of the mounting joint in FIG. 5.

With further reference to FIGS. 3, 5, and 6, when the knob 14A, 14B is rotated and moves away from the mounting tube 13A, 13B, the mounting seat 13A would loosen from the mounting end 112A, 112B of the first connecting seat 11A, 11B. Thus, the second connecting seat 12A, 12B and the mounting seat 13A, 13B can be driven to rotate around the mounting end 112A, 112B of the first connecting seat 11A, 11B with the connecting rod 122A, 122B moving along the annular groove 113A, 113B. Moreover, the second connecting seat 12A, 12B and the extending rod 20A, 20B that is connected with said second connecting seat 12A, 12B can also be rotated sideways relative to the mounting seat 13A, 13B and the first connecting seat 11A, 11B with the extending rod 20A, 20B rotating in the annular groove 113A, 113B. In this way, angular positions and extending directions of the extending rod 20A, 20B that is connected to the second connecting seat 12A, 12B can be adjusted.

When the extending rod 20A, 20B has been adjusted to an expected angular position and an expected extending direction, the mounting seat 13A, 13B can be forced to securely hold the mounting end 113A, 113B of the first connecting seat 11A, 11B by rotating the knob 14A, 14B to allow the knob 14A, 14B to move toward the mounting seat 13A, 13B. Accordingly, relative positions of the first connecting seat 11A, 11B, the mounting seat 13A, 13B, the second connecting seat 12A, 12B and the extending rod 20A, 20B are fixed.

The multi-functional and extendable mounting stand of the present invention has the following advantages. With the at least one coupling joint 10A, 10B connecting the at least one extending rod 20A, 20B, the clamp BB and the holder 40, the tablet electronic device mounted on the holder 40 can be adjusted to a height and an angular position that allow a user to read the tablet electronic device in a relax and safe pose. In addition, the multi-functional and extendable mounting stand of the present invention can also be used for mounting ancillary equipment such as a lighting apparatus, a recording apparatus and the like, so as to adjust the ancillary equipment to the best recoding or lighting position.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A coupling joint of a multi-functional and extendable mounting stand, and the coupling joint comprising:
   two coupling ends;
   a first connecting seat, one of the coupling ends of the coupling joint formed on the first connecting seat, and the first connecting seat having
      a mounting end; and
      an annular groove formed in an outer surface of the mounting end of the first connecting seat;
   a mounting seat having
      a mounting recess formed in a lower end surface of the mounting seat, wherein the mounting end of the first connecting seat protrudes in the mounting recess;
      a slit longitudinally formed through an upper end surface and the lower end surface of the mounting seat and formed through a side surface of the mounting seat; and
      a through hole extending transversely and formed through the side surface of the mounting seat;
      wherein a first central axis is defined along an extension direction along which the mounting recess extends, a second central axis is defined along an extension direction along which the through hole extends, and the first central axis and the second central axis are skew;
   a second connecting seat, the other coupling end of the coupling joint formed on the second connecting seat, and the second connecting seat having a connecting rod protruding from a side surface of the second connecting seat, mounted through the through hole of the mounting seat, and extending along a tangent line of the annular groove of the first connecting seat to pass through the annular groove, wherein the connecting rod is movable along the annular groove and is rotatable in the annular groove; and a knob connected to the connecting rod of the second connecting seat, wherein the mounting seat is held between the side surface of the second connecting seat and the knob.

2. The coupling joint as claimed in claim 1, wherein the connecting rod of the second connecting seat and the knob are connected with each other via threads.

3. The coupling joint as claimed in claim 1, wherein
the mounting seat further has a stationary engaging surface formed on the side surface of the mounting seat and around one of two ends of the through hole;
the connecting rod of the second connecting seat is mounted into the through hole of the mounting seat from the end, around which the stationary engaging surface is formed, of the through hole of the mounting seat; and
the second connecting seat further has a rotating engaging surface formed on the side surface of the second connecting seat and around the connecting rod and selectively engaging with the stationary engaging surface of the mounting seat.

4. The coupling joint as claimed in claim 1, wherein
the mounting seat further has two stationary engaging surfaces oppositely formed on the side surface of the mounting seat and around two ends of the through hole respectively;
a washer is placed between the mounting seat and the knob;
the connecting rod of the second connecting seat is sequentially mounted through the through hole of the mounting seat and the washer; and
the second connecting seat further has a rotating engaging surface formed on the side surface of the second connecting seat and around the connecting rod and selectively engaging with the stationary engaging surface of the mounting seat.

5. The coupling joint as claimed in claim 1, wherein the mounting seat further has a cable management ring formed on the side surface of the mounting seat.

6. A multi-functional and extendable mounting stand comprising:
an extending assembly having two ends and including
at least one coupling joint as claimed in claim 1; and
at least one extending rod, and each of the at least one extending rod having two connecting ends;
wherein the at least one coupling joint and the at least one extending rod arranged alternately and connected sequentially, and at least one of the connecting ends of the extending rod is connected to at least one of the coupling ends of the at least one coupling joint; and
a clamp connected to one of the coupling ends of the extending assembly.

7. The multi-functional and extendable mounting stand as claimed in claim 6, wherein the connecting rod of the second connecting seat and the knob are connected with each other via threads.

8. The multi-functional and extendable mounting stand as claimed in claim 6, wherein
the mounting seat further has a stationary engaging surface formed on the side surface of the mounting seat and around one of two ends of the through hole;
the connecting rod of the second connecting seat is mounted into the through hole of the mounting seat from the end, around which the stationary engaging surface is formed, of the through hole of the mounting seat; and
the second connecting seat further has a rotating engaging surface formed on the side surface of the second connecting seat and around the connecting rod and selectively engaging with the stationary engaging surface of the mounting seat.

9. The multi-functional and extendable mounting stand as claimed in claim 6, wherein
the mounting seat further has two stationary engaging surfaces oppositely formed on the side surface of the mounting seat and around two ends of the through hole respectively;
a washer is placed between the mounting seat and the knob;
the connecting rod of the second connecting seat is sequentially mounted through the through hole of the mounting seat and the washer; and
the second connecting seat further has a rotating engaging surface formed on the side surface of the second connecting seat and around the connecting rod and selectively engaging with the stationary engaging surface of the mounting seat.

10. The multi-functional and extendable mounting stand as claimed in claim 6, wherein the clamp is connected to the coupling end, which is defined as one of the ends of the extending assembly, of the first connecting seat of the coupling joint.

11. The multi-functional and extendable mounting stand as claimed in claim 10, wherein
the at least one coupling joint includes multiple coupling joint; and
the two connecting ends of the extending rod that is disposed between two of the coupling joints are connected to the coupling end of the first connecting seat of one of said two coupling joints and the coupling end of the second connecting seat of the other one of said coupling joints.

12. The coupling joint as claimed in claim 10, wherein the mounting seat further has a cable management ring formed on the side surface of the mounting seat.

13. The multi-functional and extendable mounting stand as claimed in claim 6, wherein
the at least one coupling joint includes multiple coupling joint; and
the two connecting ends of the extending rod that is disposed between two of the coupling joints are connected to the coupling end of the first connecting seat of one of said two coupling joints and the coupling end of the second connecting seat of the other one of said coupling joints.

14. The coupling joint as claimed in claim 11, wherein the mounting seat further has a cable management ring formed on the side surface of the mounting seat.

15. The coupling joint as claimed in claim 6, wherein the mounting seat further has a cable management ring formed on the side surface of the mounting seat.

* * * * *